United States Patent
Dabrowski

(10) Patent No.: US 10,063,471 B2
(45) Date of Patent: Aug. 28, 2018

(54) SYSTEM AND METHOD FOR MAC ADDRESSING

(71) Applicant: ADVANCED DIGITAL BROADCAST S.A., Geneva (CH)

(72) Inventor: Bartosz Dabrowski, Zielona Gora (PL)

(73) Assignee: ADVANCED DIGITAL BROADCAST S.A., Eysins (CH)

( * ) Notice: Subject to any disclaimer, the term of this patent is extended or adjusted under 35 U.S.C. 154(b) by 180 days.

(21) Appl. No.: 15/177,353

(22) Filed: Jun. 9, 2016

(65) Prior Publication Data

US 2016/0373353 A1 Dec. 22, 2016

(30) Foreign Application Priority Data

Jun. 17, 2015 (EP) ..................................... 15172459

(51) Int. Cl.
*H04L 12/741* (2013.01)
*H04L 29/12* (2006.01)
*H04L 12/721* (2013.01)

(52) U.S. Cl.
CPC .............. *H04L 45/74* (2013.01); *H04L 45/66* (2013.01); *H04L 61/2596* (2013.01); *H04L 61/6022* (2013.01); *H04L 61/6068* (2013.01)

(58) Field of Classification Search
CPC ..... H04L 45/66; H04L 45/74; H04L 61/2596; H04L 61/6022; H04L 61/6068
See application file for complete search history.

(56) References Cited

U.S. PATENT DOCUMENTS

| | | | |
|---|---|---|---|
| 2012/0243539 A1* | 9/2012 | Keesara | H04L 45/66 370/392 |
| 2012/0327811 A1* | 12/2012 | Nozaki | H04L 12/462 370/255 |
| 2015/0358233 A1* | 12/2015 | Wang | H04L 45/02 370/392 |

OTHER PUBLICATIONS

"Formally Deprecating Some IPv4 Options", RFC 6814, Nov. 2012, available at https://tools.ietf.org/pdf/rfc6814.pdf.*

* cited by examiner

*Primary Examiner* — Asad Nawaz
*Assistant Examiner* — Zhaohui Yang
(74) *Attorney, Agent, or Firm* — Mark M. Friedman

(57) ABSTRACT

Method for MAC addressing in a device operating in OSI layers 2 and 3, the method comprising the steps of: receiving a connection request (400) from a first 2MAC client (102) wherein the request comprises: the client's (102) first MAC address gMAC (406) being globally unique, the client's (102) second MAC address uMAC (407) being unique within a local 2MAC clients (102, 105) group; and a target's IP address and port (408); establishing (401) a connection between the server (108) and the first 2MAC client (102). Additionally, there is presented a method for MAC addressing in a device operating in OSI layer 2 or OSI layers 2 and 3, the method comprising: constructing (253) a packet from a first 2MAC client (102) targeted at another 2MAC client (105) wherein the packet comprises: the client's (102) first MAC address gMAC (406) being globally unique and the client's (102) second MAC address uMAC (407) being unique within a local 2MAC clients (102, 105) group.

11 Claims, 5 Drawing Sheets

SYSTEM AND METHOD FOR MAC ADDRESSING

The present invention relates to a system and method for MAC addressing. In particular the present invention relates to overcoming a problem of Internet Protocol-IP (Open Source Interconnection (OSI) Network layer) addressing on devices that need to exist and communicate inside an OSI network but are still presented without a MAC address (media access control address). Such a scenario is possible due to e.g. depleting available MAC address space.

The present invention relates mainly to Internet Protocol (IP) based computer networks (e.g. The Internet). It is inherent to such networks that each and every entity connected to such network, must have an address assigned, in order to receive dedicated communication and transmit communication. Moreover, the address needs to be unique in order to ensure consistency of the entire computer network.

The present invention relates also to the existing (OSI) layered model (or similar) used commonly in existing computer networks. In such model, the addressing, mentioned in the previous paragraph, is performed in the Network Data Link (2) layer. It is important that this addressing is required, or in some possible cases preferred, for the whole addressing model to operate consistently.

The aforementioned addressing, inherent to the aforementioned OSI model, is usually realized by a MAC address, e.g. in IEEE 802 local area networks. The MAC address is a 48 bit data set that identifies a given device in the network in an unambiguous manner. However, due to its fixed definition, the MAC address space is still limited.

The present invention relates also to the growing ever more popular concept of the Internet of Things (IoT), which may in the future exhaust this address space very quickly. Hence, it may be needed e.g. to encapsulate groups of devices into closed networks managing MAC addressing in a different manner then the rest of the network.

Prior art presents many different solutions towards ensuring the uniqueness of the addressing on OSI Network Data Link (2) layer. These solutions include a static (and preferably controlled) assignment of MAC or IP addresses (for Network layer), BOOTP protocol or DHCP protocol or methods of generating MAC address in place on the device.

Prior inventions point to a number of techniques attempting at an automatic generation of MAC address. For example, the publication U.S. Pat. No. 7,411,952 B2 describes a method of initialization of an address of a device newly connected to a network of an existing structure. The publication U.S. Pat. No. 7,411,952 B2 allows for initialization for a MAC address of an entity based on queries and responses from the existing network. Further a prior application EP15158591.6 of the Applicant, describes a method of MAC address assignment based on a centralized control by a server and multicast transmission.

A limitation of the aforementioned methods, lies in the necessity to control the current existing set of MAC addressing in the current network using either a centralized or a scattered method.

Thus, there exists a need for an alternative method being more in line with currently well adopted method of assignment of the MAC address at manufacturing or provisioning of each MAC capable device.

The aim of the development of the present invention is an improved and effective method and apparatus for MAC addressing.

SUMMARY AND OBJECTS OF THE PRESENT INVENTION

The first object of the present invention is a method for MAC addressing in a device operating in OSI layers 2 and 3, the method comprising the steps of: receiving a connection request from a first 2MAC client wherein the request comprises: the client's first MAC address gMAC being globally unique, the client's second MAC address uMAC being unique within a local 2MAC clients group; and a target's IP address and port; establishing a connection between the server and the first 2MAC client.

Preferably, it further comprises: receiving data from the client for the 2MAC client; constructing an Ethernet packet, based on the received data, for the 2MAC client comprising: the client's first MAC address gMAC being globally unique, the target client's first MAC address gMAC being globally unique, the IP options field of the Ethernet packet comprising the client's second MAC address uMAC being unique within a local 2MAC clients group; transmitting the packet to the 2MAC client.

Preferably, it further comprises: sending data received from 2MAC client to client.

Another object of the invention is a method for MAC addressing, in a client to client transmission, in a device operating in OSI layer 2 or OSI layers 2 and 3, the method comprising the steps of: constructing an Ethernet packet from a first 2MAC client targeted at another 2MAC client comprising: the client's first MAC address gMAC being globally unique, the target client's first MAC address gMAC being globally unique, the IP options field of the Ethernet packet comprising: the client's second MAC address uMAC and the target client's second MAC address uMAC both being unique within a local 2MAC clients group; transmitting the constructed packet.

Another object of the invention is a method for MAC addressing, in a client from client reception, in a device operating in OSI layer 2 or OSI layers 2 and 3, the method being characterized in that it comprises the steps of: receiving an Ethernet packet from a 2MAC client by another 2MAC client comprising: the client's first MAC address gMAC being globally unique, the target client's first MAC address gMAC being globally unique, the IP options field of the Ethernet packet comprising the client's second MAC address uMAC being unique within a local 2MAC clients group; comparing the gMAC address with own gMAC address, comparing the uMAC address with own uMAC address.

Preferably, the IP options field comprises option length word in order to ensure consistency of the packet.

Preferably, the content of the IP options field is selected with regard to IANA-IP option numbers and RFC6814.

Preferably, the IP options field comprises uMAC option type identifier, uMAC option length identifier, the destination uMAC, the own uMAC.

Preferably, the destination uMAC and the own uMAC are 6-byte addresses.

Another object of the present invention is a computer program comprising program code means for performing all the steps of the computer-implemented method according to the present invention when said program is run on a computer.

Another object of the present invention is a non-transitory computer readable medium storing computer-executable instructions performing all the steps of the computer-implemented method according to the present invention when executed on a computer.

A further object of the present invention is a computer network comprising: at least one 2MAC client having assigned: the client's first MAC address gMAC being globally unique, wherein the gMAC address is the same for all 2MAC clients; the client's second MAC address uMAC being unique within a local 2MAC clients group.

Preferably, it further comprises: at least one 2MAC server configured to avow the communication of the devices in a 2MAC group and the remainder of the clients wherein any 2MAC client, communicating with another client outside of the group, does it via the 2MAC sever using this server's MAC address as destination address.

Preferably, the 2MAC client has an IP address assigned.

Preferably, it further comprises a DHCP server wherein all 2MAC clients receive same responses to DHCP queries and thus have the same IP address assigned by the DHCP server.

BRIEF DESCRIPTION OF THE DRAWINGS

These and other objects of the invention presented herein, are accomplished by providing a system and method for MAC address acquisition. Further details and features of the present invention, its nature and various advantages will become more apparent from the following detailed description of the preferred embodiments shown in a drawing, in which.

NOTATION AND NOMENCLATURE

Figure 1:
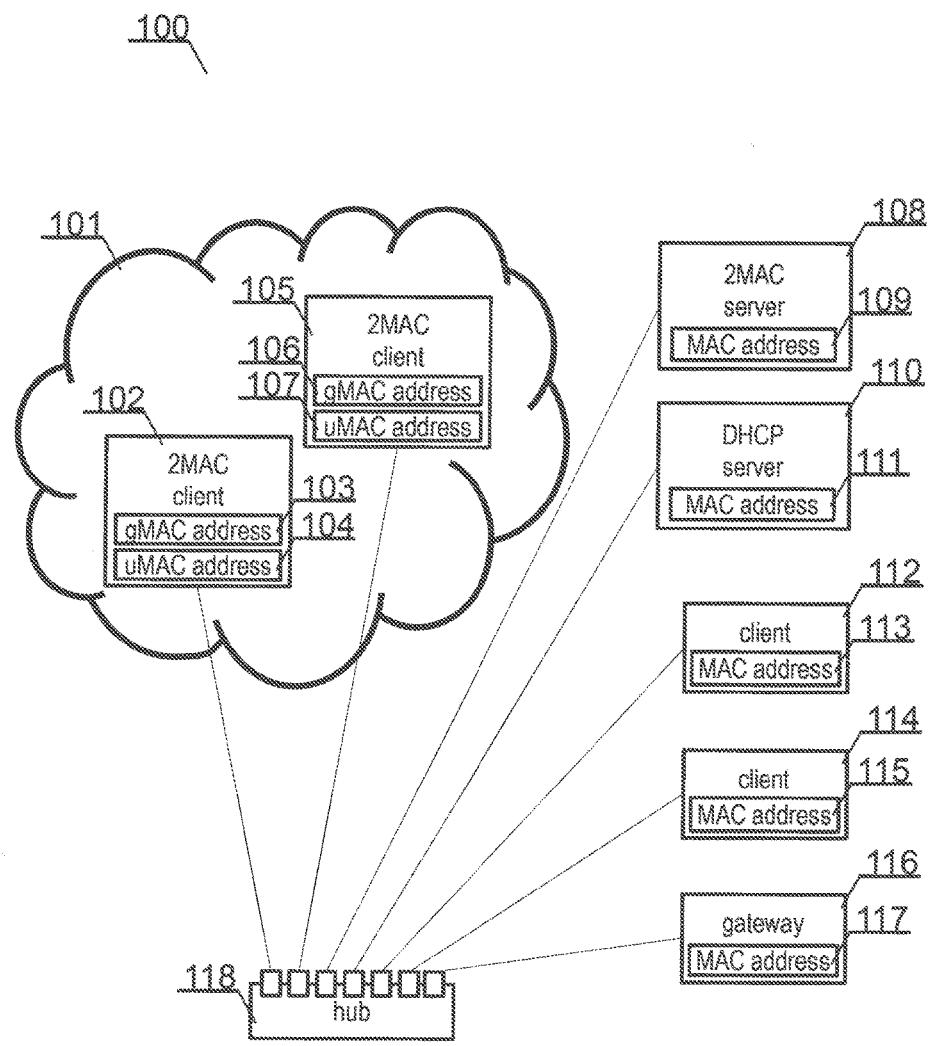
FIG. 1 presents a diagram of a system according to the present invention.

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

The present invention provides a solution to the aforementioned limitations of the prior art publications. This method allows for a group of OSI network devices to operate without conflicts within a network allowing for communication within that group.

This is achieved by using two MAC addresses for the purpose of communications. One MAC address is used with standard Data Link Layer (2) of the aforementioned OSI model. This MAC is considered a unique, global MAC address as assigned by the manufacturer. However, in this case the MAC is assigned to a group of units instead of one. This MAC address is called in the present invention the group MAC i.e. gMAC hereinafter.

In addition to the gMAC address, each unit is assigned, at manufacturing or installation (or the like) time, with a unique address of its own. This unique address can be a 48 bit MAC or any other unique address. In the present invention this address is called unique MAC i.e. uMAC hereinafter.

A device that utilizes the present invention uses the gMAC address in the standard Data Link Layer (2) communication and appends the uMAC address as an IP header option in the standard Network Layer (3). The below table depicts an example of such embedding of a uMAC:

| octet | 0 | 1 | 2 | 3 |
|---|---|---|---|---|
| 0-19 | standard IP header data | | | |
| 20 | uMAC option type | uMAC option length | destination uMAC[0] | destination uMAC[1] |
| 24 | destination uMAC[2] | destination uMAC[3] | destination uMAC[4] | destination uMAC[5] |
| 28 | own uMAC[0] | own uMAC[1] | own uMAC[2] | own uMAC[3] |
| 32 | own uMAC[4] | own uMAC[5] | | |

The option type may and typically will be selected with regard to IANA-IP option numbers and RFC6814. An exemplary embodiment can use one of the options defined by IANA-IP option numbers and formally deprecated by RFC6814. Hence the aforementioned embodiment may use the option: 'Address Extension'. This option has the following qualities according to IANA-IP option numbers: 'copied' flag set to 1, 'class' field set to 0, 'option number' set to 10, thus uMAC option type is 147, which is 93 (hexadecimal) and 10010011 (binary). Option length is 14, which constitutes 2 MAC addresses, each 6 bytes plus one byte of field length and one byte of option type field.

There follows an exemplary embodiment of the present invention describing an exemplary system utilizing the aforementioned method of using two MAC addresses, namely gMAC and uMAC during a single network communication.

FIG. 1 presents a diagram of a system according to the present invention. The system comprises an Ethernet network (100) and devices connected thereto. The network contains devices (112) and (114) that operate according to standard, well known methods using their respectively assigned OSI Data Link Layer (2) MAC address (113, 115) for identification. Each of these devices (112, 114) comprises at least one MAC address, assigned typically at manufacturing time.

The system further comprises 2MAC clients (102, 105). Both of them have a group MAC address (103) and (106) of the same value assigned (gMAC). This gMAC address can be assigned at manufacturing time. It can also be obtained using one of the methods described in prior art. It is therefore in no way limiting to the present invention, how a gMAC is obtained just as long as it remains unique towards clients other than the 2MAC clients (102, 105) within the group 101.

Each of the 2MAC clients is further equipped with a unique MAC address (104, 107). This uMAC address is unique in the scope of all uMAC addresses within a local 2MAC devices group (101) but does not need to be unique in the scope of all MAC addresses (global gMAC addresses, regular MAC addresses). Naturally, the uMAC does not need to be a 48 bit MAC address as defined by Ethernet network. It can be any definition fitting the same purpose. The present invention uses Ethernet MAC address definition for this purpose due to clarity of its definition.

The system further comprises a hub device (118). It is a typical feature of such hub device, that it operates in a lower layer then the Network Layer (3) of the OSI model. Typically, a hub operates in the Data Link Layer (2) thus not implementing network traffic optimization, packet routing or rejection.

It is a characteristic of the present invention, that the hub (118) operates in the Data Link (2) layer or lower. It is clear to a one skilled in the art, that such limitation allows for Ethernet packets transmitted through the network to be passed, on by the hub (118), unconditionally in opposition to a device operating in Network Layer (3) of the OSI model. However, it is in no way limiting to the present invention if the device (118) is in fact a switch device or a router or the like presenting the same aforementioned characteristics regardless of operation layer in the OSI network model.

The system may, and typically will, comprise further devices: a 2MAC server (108) and/or a DHCP server (110) and/or a gateway (116). However, it is in no way limiting to the present invention whether these exist or not. They serve the purpose of enabling the 2MAC clients (102, 105) to form a 2MAC group (101) in order to communicate with the remainder of network devices.

Therefore, the function of the DHCP server (110) remains unchanged with respect to the generally known DHCP server. It is therefore, a consequence of such definition of DHCP server (110) that all 2MAC clients will receive same responses to DHCP queries and therefore will have the same IP address assigned by the DHCP server.

Similarly, the queries of the 2MAC clients using the same MAC address in the Ethernet frame, may result in errors in communication while assigning IP addresses. It is therefore in no way limiting to the present invention whether this behavior of the system is mitigated in any way.

The present system further comprises a 2MAC server (108). The purpose of this 2MAC server is to allow the communication of the devices in the 2MAC group (101) and the remainder of the clients (112) and (114). Therefore, any 2MAC client, communicating with a client outside of the group (101), will do that via the 2MAC sever (108) thus using this servers MAC address (109) as destination address.

The system further comprises a gateway (116) comprising a MAC address (117) allowing further communication between the system (100) and an outside computer network.

In order to fully understand the present embodiment of the present invention, further diagrams are presented depicting different exemplary embodiments of communication scenarios.

Figure 2:
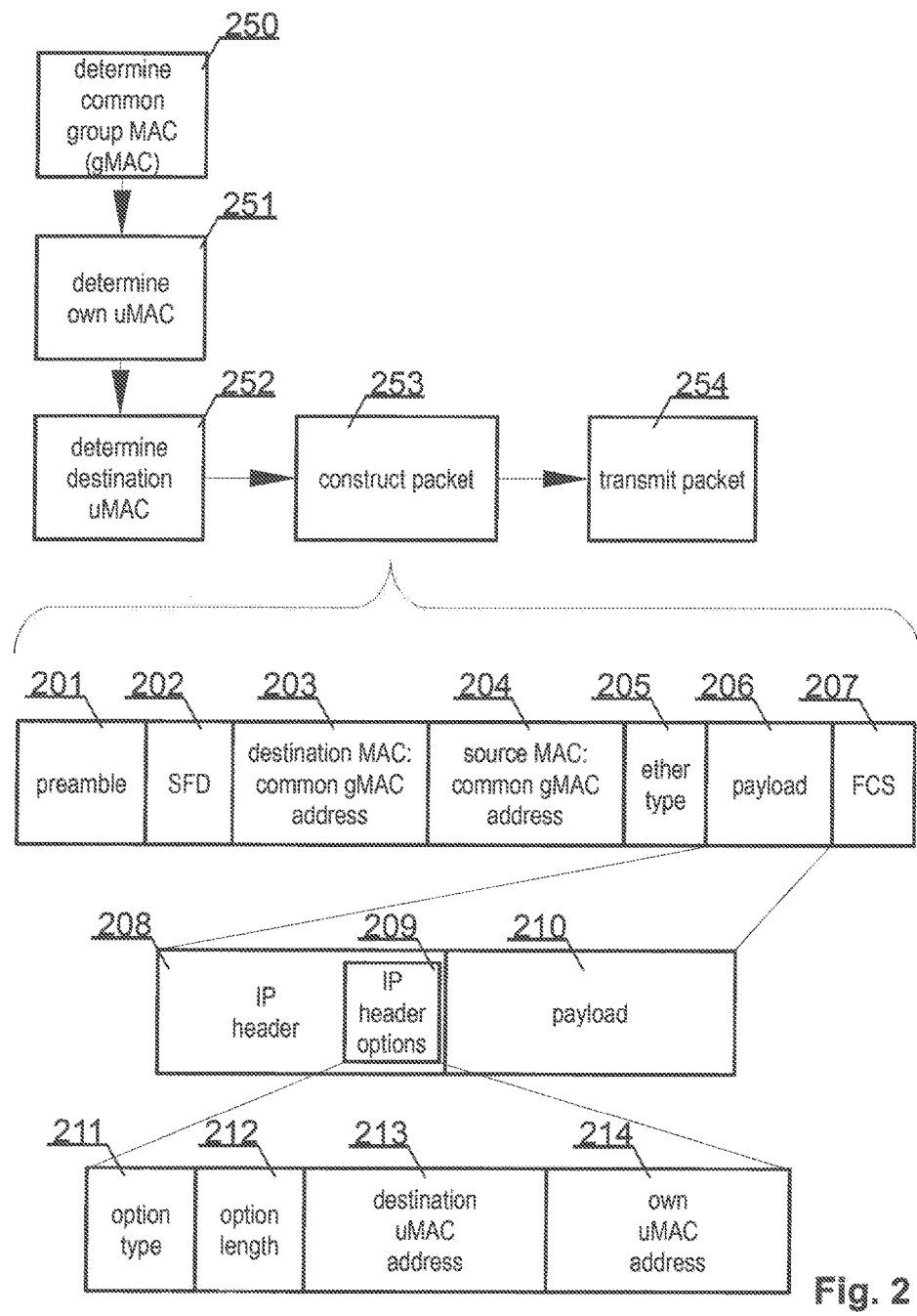
FIG. 2 presents a diagram of a preparation of an IP/Ethernet packet sourced at a 2MAC client device and targeted at another 2MAC client device.

Moving on to FIG. 2, a scenario is presented of construction of an IP/Ethernet packet sourced at a 2MAC client (102) device and targeted at another 2MAC client (105). It will become apparent to a one skilled in the art after understanding the present embodiment that a packet sourced from a client (102) of group (101) can be targeted at another client (105) in group (101) or at a client in another group analogous to (101). Thus adaptation of gMAC (203) would be needed.

The 2MAC client (102) starts by determining its group address: gMAC (203)/(204) at step (250). It is in no way limiting to the present invention how this MAC is determined just as long as it is unique in the global scope excluding clients contained in group (101). It is therefore possible and typically will be implemented in this way that gMAC is an inherent value of the device just as present Ethernet devices have their MAC address embedded as an inherent value. Another exemplary embodiment of determining gMAC is acquisition by a multicast protocol as described in the application EP15158591.6 of the Applicant.

Next at step (251) own uMAC (214) is determined. It can be determined in a similar way as gMAC. It is however preferable to the present embodiment that this address is embedded in the device as an inherent value.

At step (252) the destination uMAC (213) is determined. This MAC is known to the transmitting device by existing well known methods. It is obvious to a one skilled in the art that this address can be simple hard-coded into the device or obtained using e.g. ARP e.g. as defined by RFC826 or the like.

Subsequently, at step (253), the complete Ethernet packet is constructed. The packets contain fields as defined by respective standards. An exemplary embodiment may be an Ethernet frame as defined by IEEE 802.3: preamble (201), SFD (202), ether type (205), FCS (207), IP payload (206) which further comprises: IP header (208), IP packet payload (210) and IP header options (209).

The IP options (209) field is filled with one option that contains the destination uMAC (213) and own uMAC (214). The option type (211) may be constructed in many ways as to best fit the purpose of the network or limitations or the like. The option length (212) needs to be set to ensure consistency of the packet (typically will have a value of 14 which is the length of two 48 bit MAC addresses and two bytes for option length and type. Finally the packet is transmitted at step (254). Other options may be included as well which is not limiting to the present invention.

Figure 3:
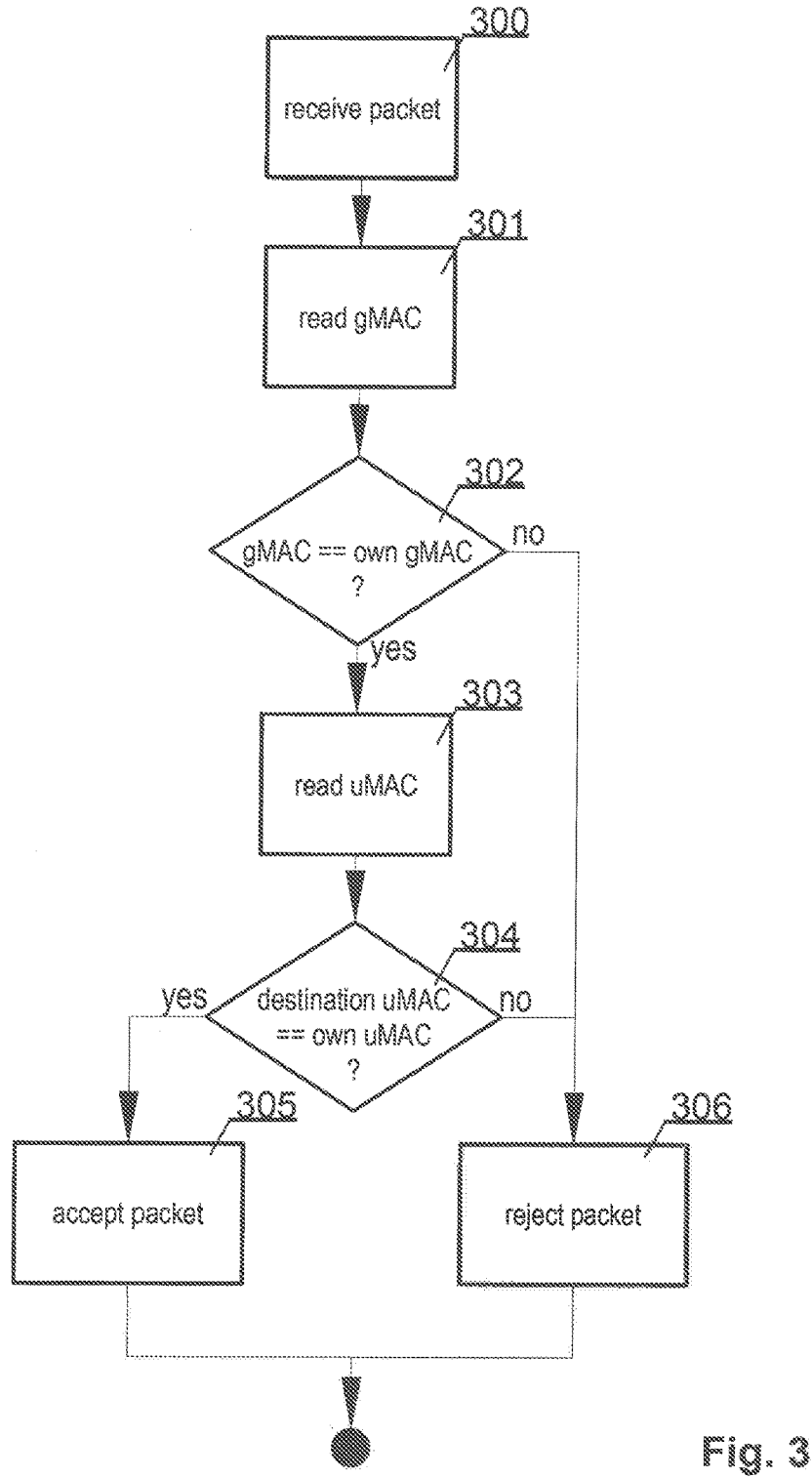
FIG. 3 shows an exemplary flow of communication between two 2MAC clients of the system-reception of a packet.

The client (105) receives the packet. The flow of this exemplary embodiment is shown in FIG. 3. The packet is received at step (300) and the destination gMAC field is read from the Ethernet packet header at step (301). Next, the read gMAC is compared with device's own gMAC (106). If the two are different, the packet is rejected at step (306). Otherwise, it is accepted and the destination uMAC is read from the IP header options at step (303) and compared against own uMAC (107) at step (304). If those two differ, the packet is rejected at step (206). Otherwise, it is accepted at step (305) for processing.

It is clear, to one skilled in the art, that the communication scenarios described in the presented embodiments of the present invention are not possible to realize when one of the clients involved is not contained in the group (101) or another analogous group.

There is therefore presented, in the present embodiment of the present invention, the 2MAC server (108). The 2MAC server (108) serves a purpose of bridging communication between a device inside the group (101) and a device outside of the group (101).

The server (108) works in a connection mode i.e. in order to properly relay communication it establishes connection with both clients (102) and (114). The exemplary process flow of this communication is shown in FIG. 4.

The process flow begins at step (400) with a connection request from a 2MAC client (102). The request comprises the client's (102) gMAC (406), uMAC (407) and a target's IP address and port (408). This information is then cached in a cache memory (405).

Other information may be contained in the request and cached, which is not limiting to the present invention in any way. The server (108) then establishes a connection between the server (108) and the client (114) at step (401). It is characteristic towards the present embodiment of the present invention that the server (108) actively participates in the communication and establishes a connection between itself and the client (114) rather than directly between the 2MAC client (102) and client (114) thus serving as a type of proxy. Server (108) receives data from the client (114) at step (402) further constructing the packet at step (403). This packet is meant for the 2MAC client (102) and can be constructed as depicted in FIG. 2 with the difference that the 2MAC server (108) may use its own MAC address (109) in place of the uMAC (214). It may also use its own MAC address (109) in piece of the gMAC (204).

Figure 4:
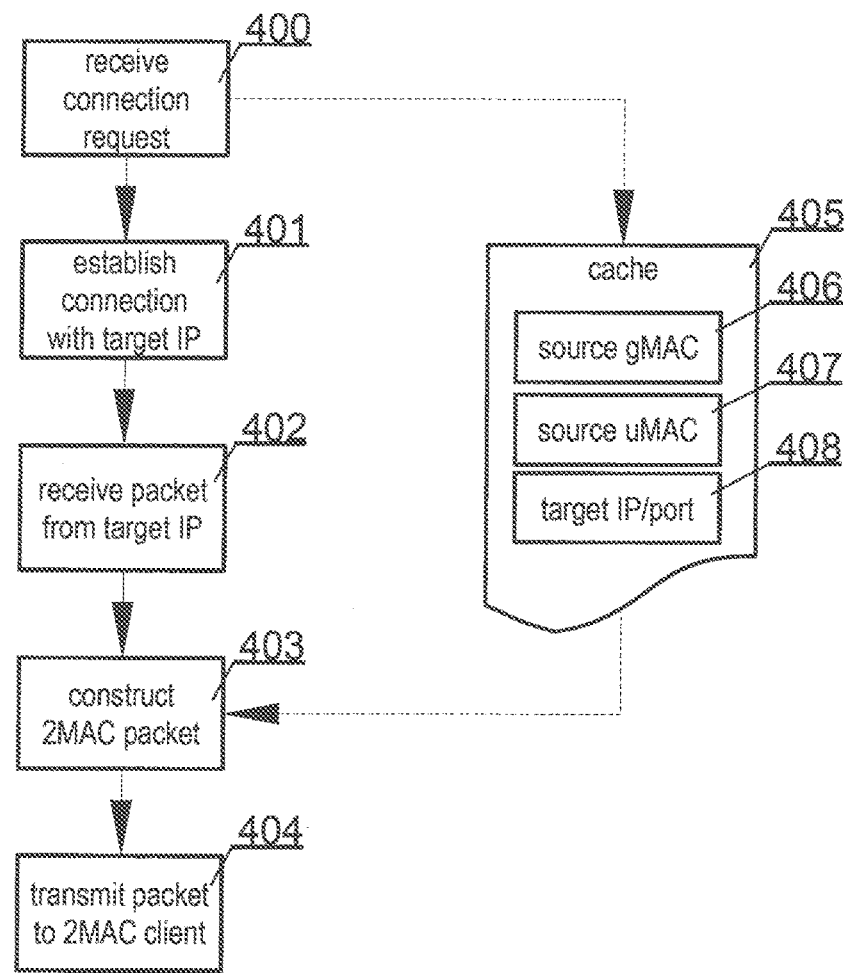
FIG. 4 shows an exemplary flow of operation of 2MAC server.

Although FIG. 4 depicts an embodiment of the present invention where the communication between 2MAC client (102) and client (114) is bidirectional, it is in no way limiting to the present invention whether this communication is indeed bidirectional. It may well be that the server (108) transmits data to client (114) and in fact receives none from client (114). This should not be construed as a limitation but rather as a use case of the present invention.

It is the characteristic of the presented exemplary embodiment that all units contained in group (101), and therefore constructed according to the present invention, may communicate with each other without any additional entity.

It is also the limitation of the presented embodiment that in order to communicate with a device external to group (101) an additional entity is needed, here presented as 2MAC server (108). With this limitation in mind it is still possible for the 2MAC clients, present in the group (101), to use the existing infrastructure and existing and well known Ethernet network devices to communicate while at the same time utilizing only one unique MAC address from the currently used worldwide pool of 48 bit MAC addresses.

The described embodiment may be compared to a Local Area Network placed behind a router device e.g. a NAT (Network Address Translation) server. The solution utilizing a NAT server and a resulting LAN is limited by the physical connection of the units i.e. the units that utilize the same IP address need to communicate over a separate (physically) network. At the same time the present invention eliminates that disadvantage by allowing the connected clients belonging to the group (101) to communicate over the existing infrastructure not separated from devices outside of group (101). This comparison is depicted in FIG. 5A and FIG. 5B.

Figure 5A:
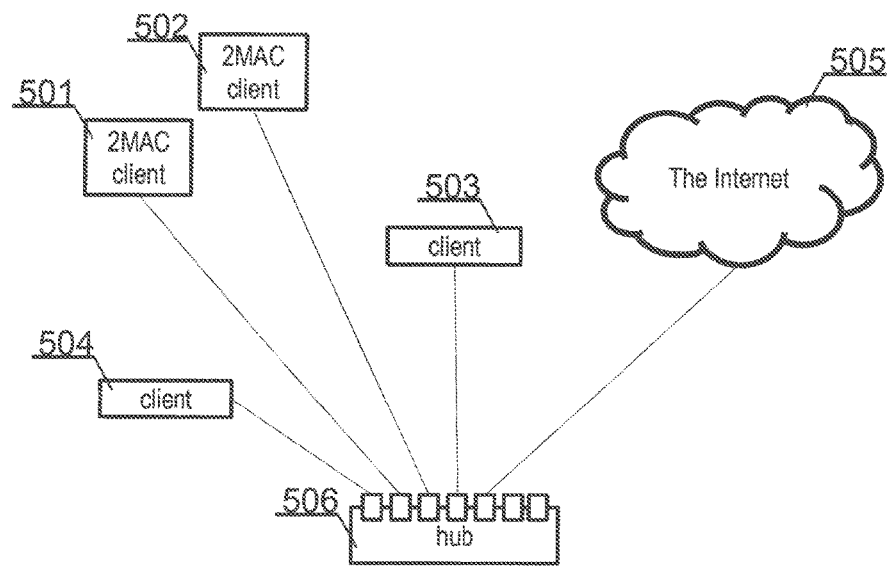
FIG. 5A and FIG. 5B present network organization examples according to the present invention.
Figure 5B:
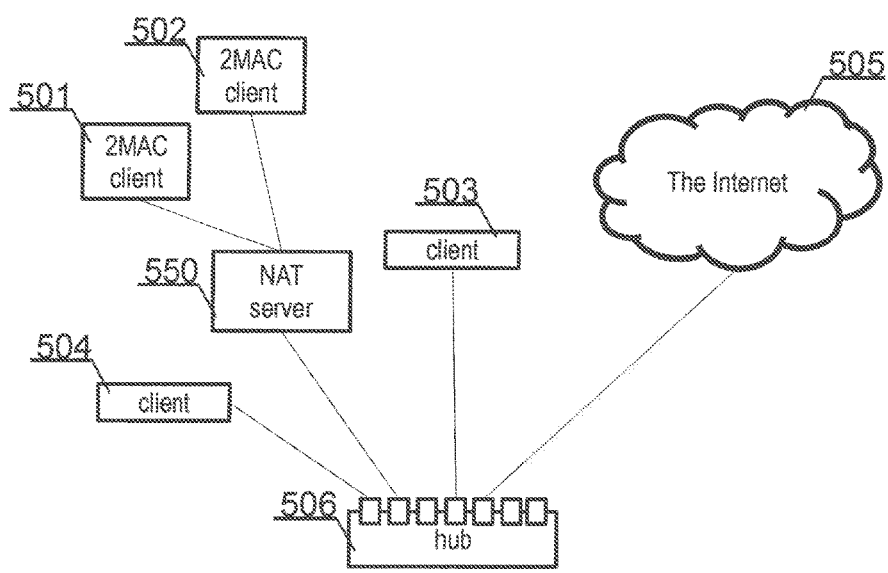

The schematics in FIG. 5A shows an embodiment of the present invention where 2MAC clients (501) and (502) are connected to the existing infrastructure, to hub (506), same as clients (503) and (504). That device may further be connected to the Internet (505). The system, depicted in FIG. 5B, by comparison shows a necessity for using an additional NAT server (550) device to facilitate the 2MAC clients (501) and (502) and thus may and typically will require the modification of infrastructure.

The present invention also provides a generic solution that is possible to implement on almost every platform compliant with the OSI layered network model. Further, the present invention also provides a method that is independent of the inherent qualities of the platform it is operating on e.g. chip identification information or the like.

The present invention also guarantees uniqueness of the assigned addressing regardless of the quantity of the devices connected to the network or timings of the processes described or the results of these processes or the like. Therefore, the invention provides a useful, concrete and tangible result.

Applications of the present invention involve acquisition and application of network addresses implementable in any network-connectable device. The network addresses are suitable processed and applied, thus the machine or transformation test is fulfilled and the idea is not abstract.

It can be easily recognized, by one skilled in the art, that the aforementioned method for MAC addressing may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A Method for MAC addressing, in a client-server network, in a device operating in OSI layers 2 and 3, the method comprises the steps of:
providing said client-server network, which includes a plurality of 2MAC clients;
configuring said client-server network to include for each of said 2MAC clients:
a first MAC address gMAC which is globally unique, said gMAC address is the same for all of the 2MAC clients; and, a second MAC address uMAC, which is unique within a local 2MAC client group;

configuring at least one 2MAC server to allow communication between devices associated with 2MAC clients that are included within a 2MAC group, and with other 2MAC clients, wherein any 2MAC client communicating with another client outside of the 2MAC client group communicates via the 2MAC server using the MAC address of the 2MAC server as a destination address;

receiving a connection request from a first 2MAC client wherein the request comprises:
 the gMAC address of the first 2MAC client;
 the uMAC address of the 2MAC client; and,
 an IP address and port of a target 2MAC client;
and,
 establishing a connection between the 2MAC server and the first 2MAC client.

2. The method of claim 1, further comprising:
receiving data from a client addressed to the 2MAC client;
constructing an Ethernet packet based on the received data, for the 2MAC client comprising:
 the client's first MAC address gMAC being globally unique,
 the target client's first MAC address gMAC being globally unique,
 the IP options field of the Ethernet packet comprising the client's second MAC address uMAC being unique within a local 2MAC clients group; and,
transmitting the packet to the 2MAC client.

3. The method according to claim 2, wherein the IP options field comprises option length word in order to ensure consistency of the packet.

4. The method according to claim 2, wherein the content of the IP options field is selected with regard to IANA-IP option numbers and RFC6814.

5. The method according to claim 4, wherein the IP options field comprises uMAC option type identifier, uMAC option length identifier, the destination uMAC, the own uMAC.

6. The method according to claim 5, wherein the destination uMAC and the own uMAC are 6-byte addresses.

7. The method of claim 1, further comprising:
sending data received from the 2MAC client to the client.

8. A non-transitory computer readable medium storing computer-executable instructions performing all the steps of the computer-implemented method according to claim 1 when executed on a computer.

9. A computer network which comprises:
a plurality of 2MAC (Media Access Control) clients, each of the 2MAC clients comprising a processor and a non-transitory computer readable medium, and having assigned:
 a client's first MAC address gMAC, the gMAC address being globally unique, and the gMAC address is the same for all 2MAC clients; and,
 a client's second MAC address uMAC, the uMAC address being unique within a local 2MAC clients group; and,
at least one 2MAC server, each comprising a processor and a non-transitory computer readable medium and configured to allow communication of devices associated with the clients: 1) within a 2MAC client group, and 2) with other 2MAC clients, and wherein any 2MAC client communicating with another client outside of the 2MAC client group performs this communication via the 2MAC server using MAC address of the server as a destination address.

10. The computer network of claim 9, wherein each of said 2MAC clients has an Internet Protocol (IP) address assigned.

11. The computer network of claim 9, further comprising a DHCP server wherein all of the 2MAC clients receive the same responses to DHCP queries and thus have the same IP address assigned by the DHCP server.

* * * * *